UNITED STATES PATENT OFFICE.

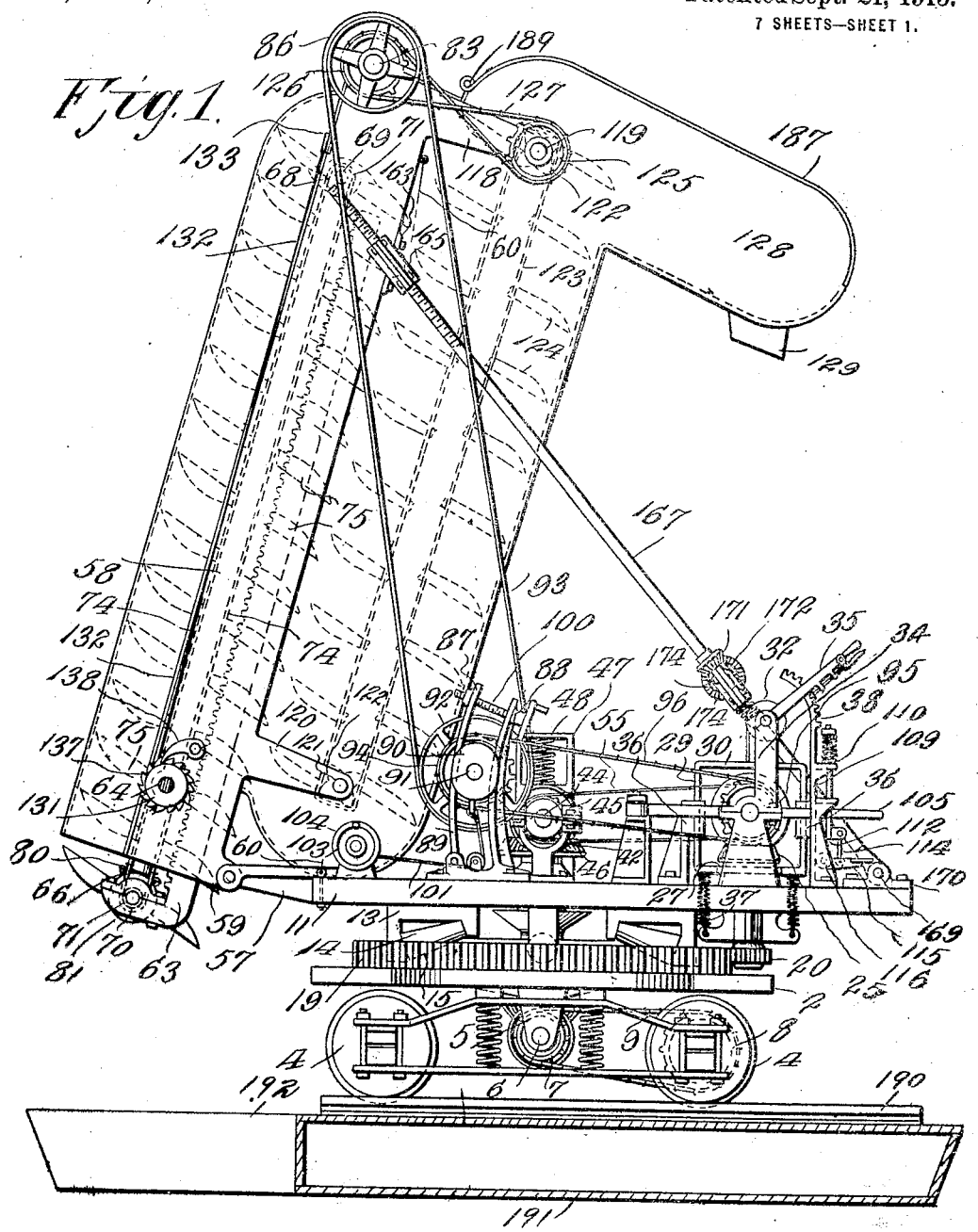

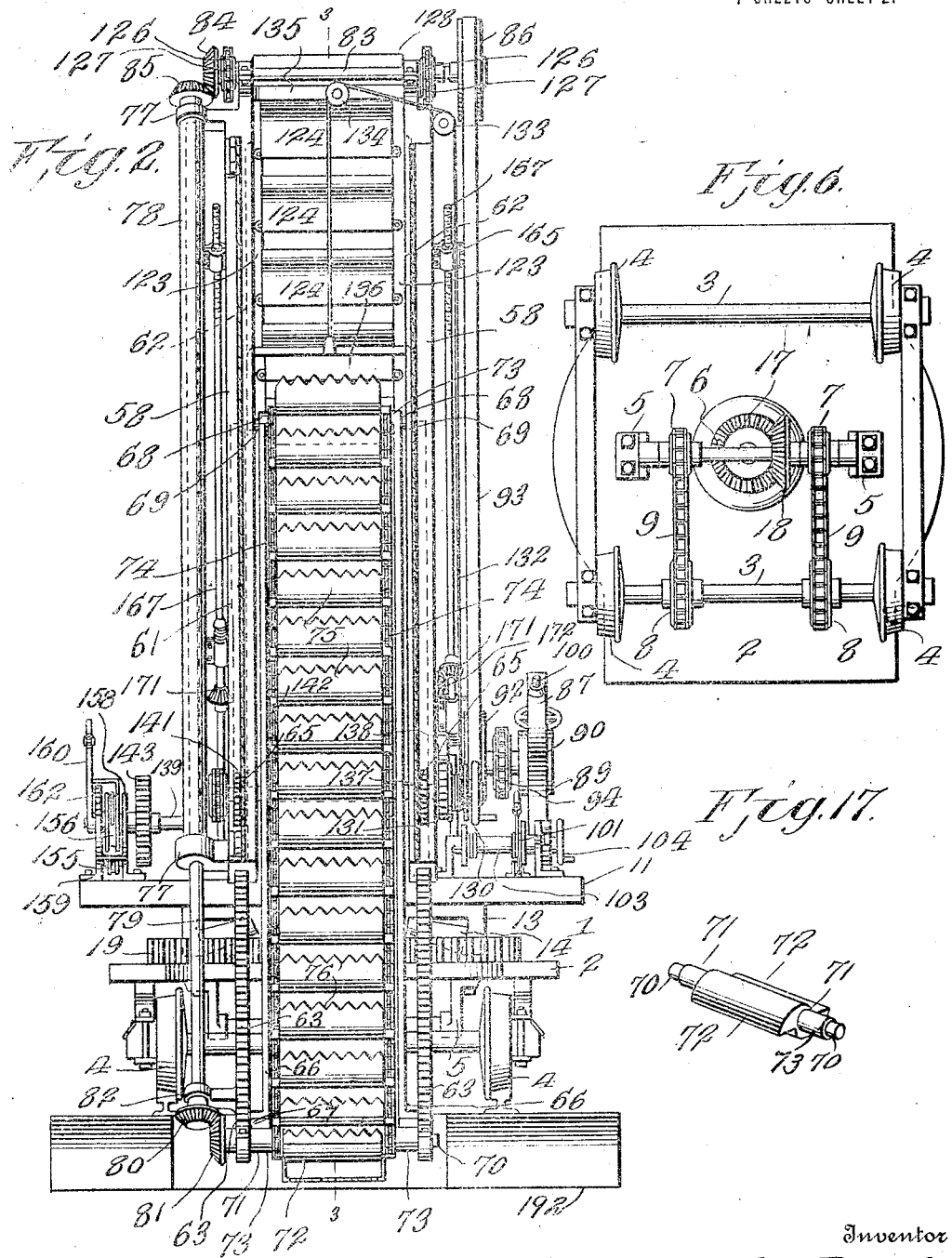

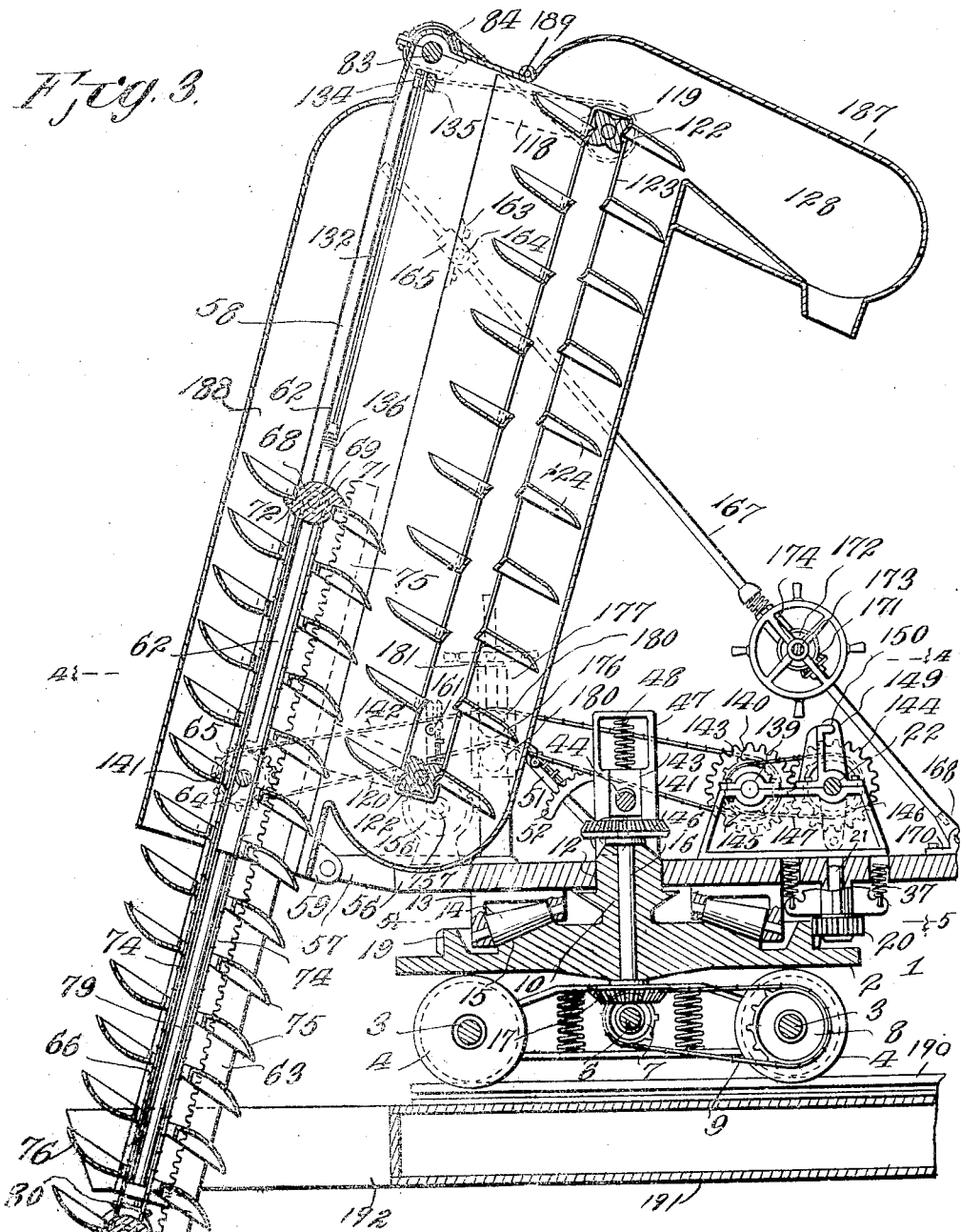

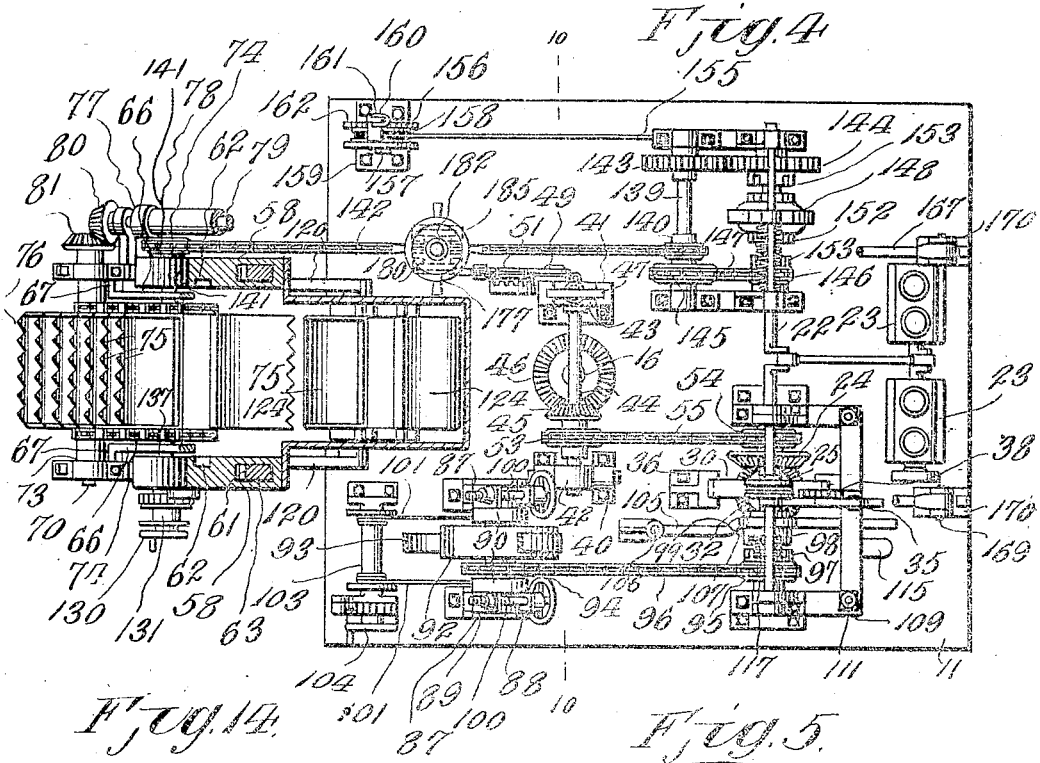

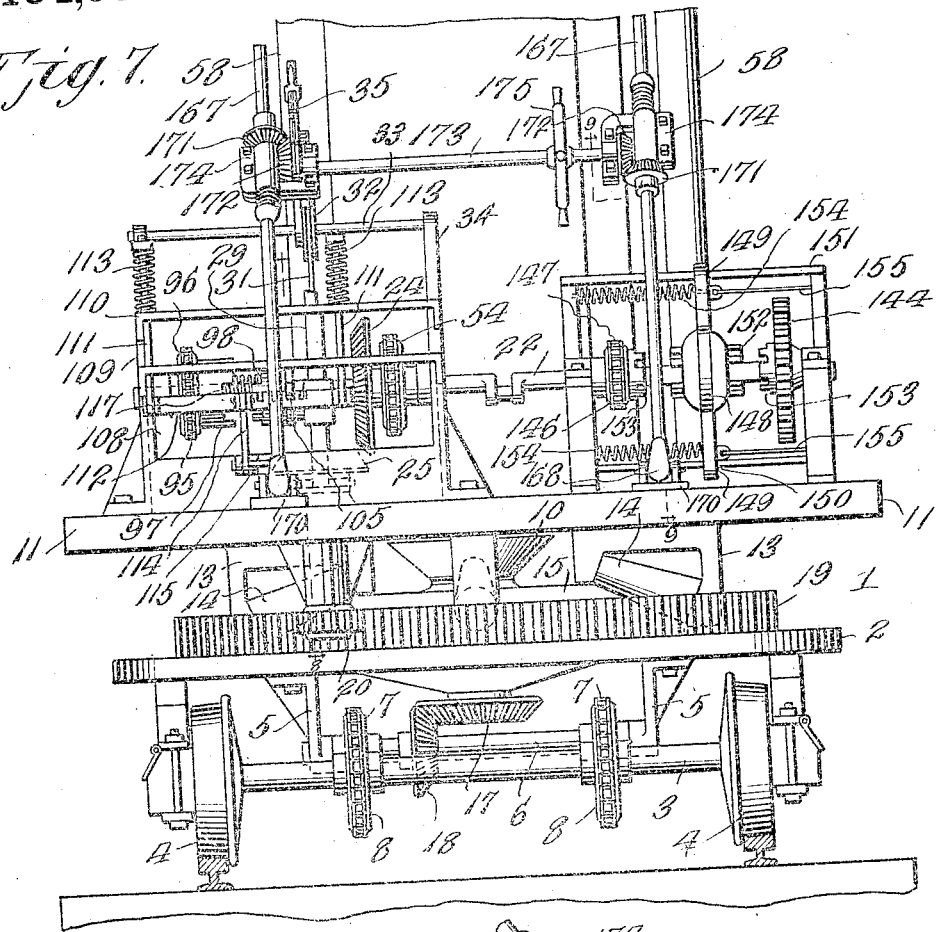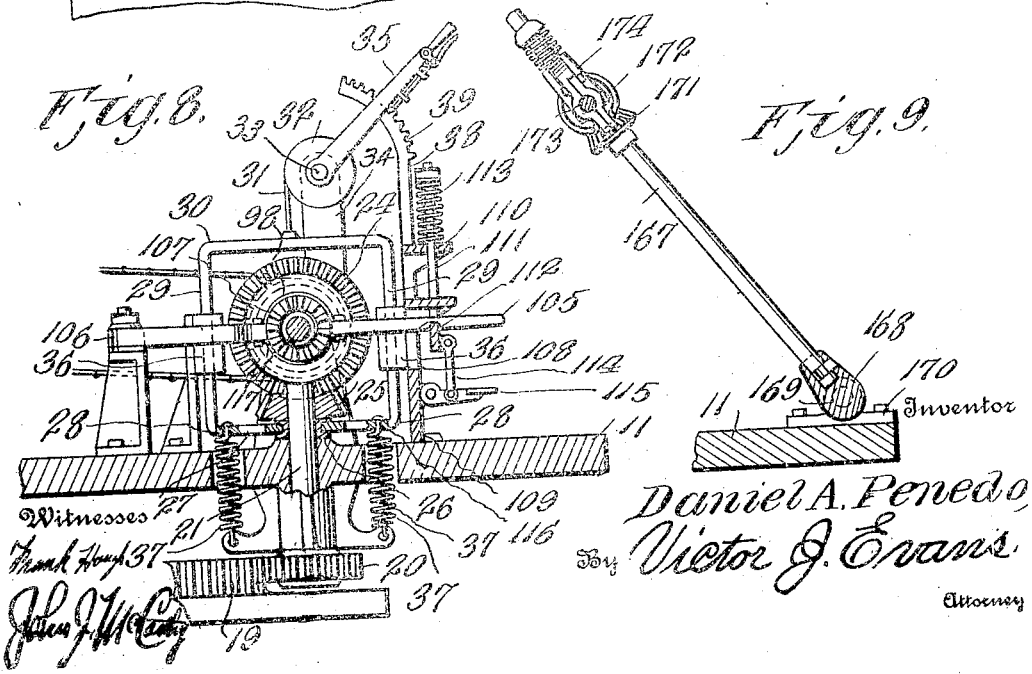

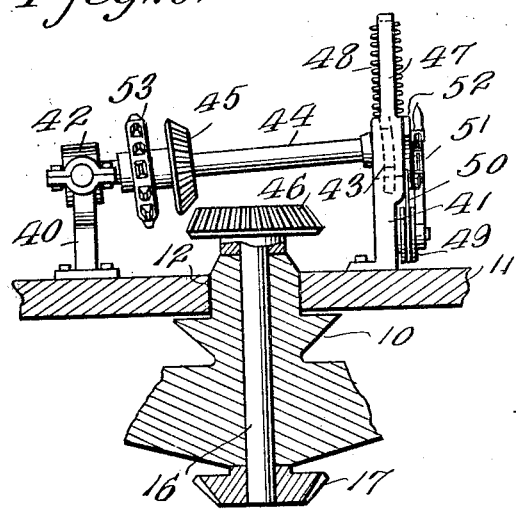
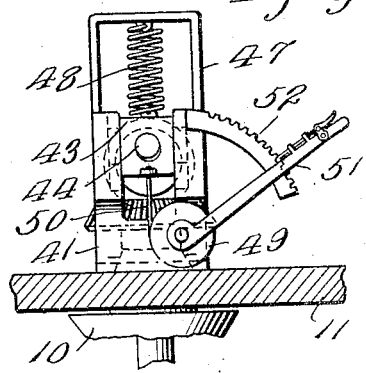
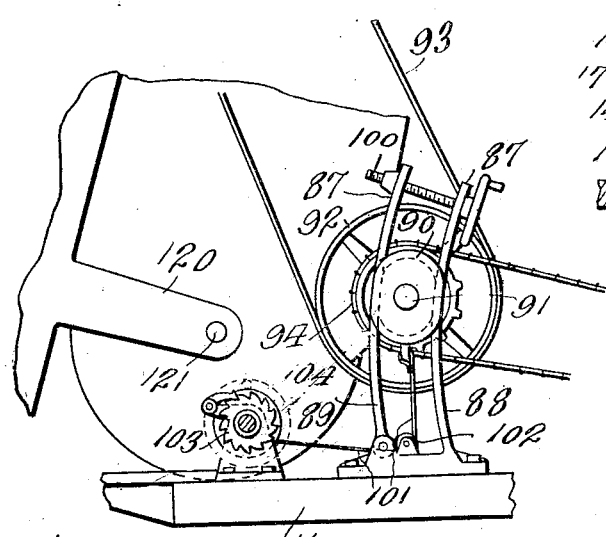
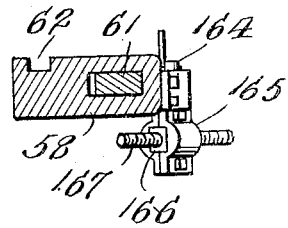

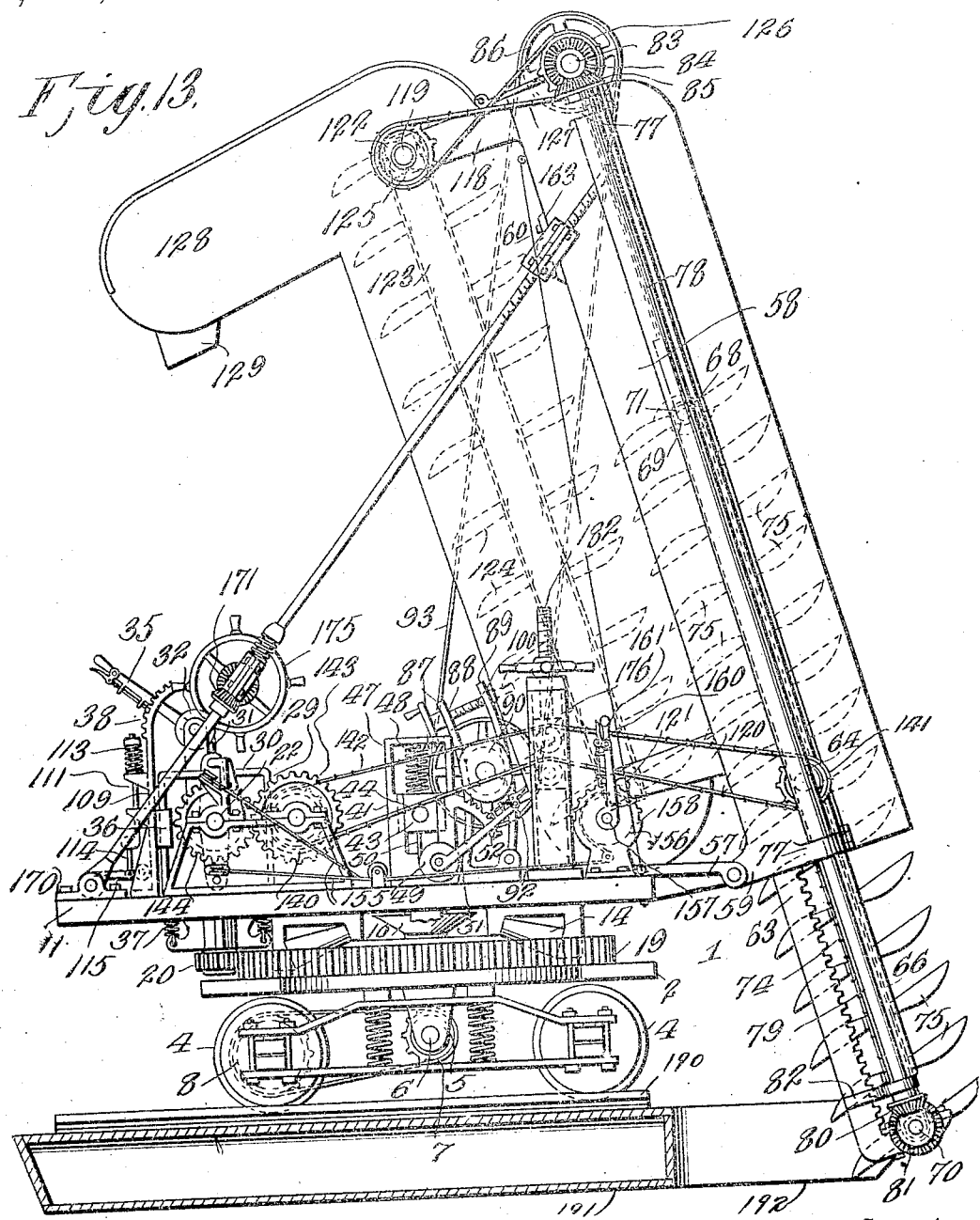

DANIEL A. PENEDO, OF BISBEE, ARIZONA.

DIGGING-MACHINE.

1,154,545.

Specification of Letters Patent.

Patented Sept. 21, 1915.

Application filed August 18, 1914. Serial No. 857,401.

*To all whom it may concern:*

Be it known that I, DANIEL A. PENEDO, a citizen of the United States, residing at Bisbee, in the county of Cochise and State of Arizona, have invented new and useful Improvements in Digging-Machines, of which the following is a specification.

This invention relates to improvements in digging machines and has particular application to a machine which may be used for dredging, excavating, conveying and analogous purposes.

In carrying out the present invention, it is my purpose to provide a machine of the class described which will embody among other features what may be termed a digger capable of vertical adjustment so that the same may be fed downwardly as the digging progresses and an endless conveyer in communication with the digger and adapted to receive the material therefrom in order that such material may be carried away to the desired point, means being provided whereby the digger and excavator may be swung simultaneously so that the digger may be disposed at any desired angle.

It is also my purpose to provide apparatus of the type set forth wherein the digging and conveying mechanism may be swung in an arc of a circle in order that the material may be excavated or conveyed from any desired point.

A further object of my invention is the provision of a digging apparatus which may be readily transported from place to place and which will be self-propelled and wherein the various controlling devices will be under the control of the engineer or operator so that the digger and conveyer may be shifted to any desired position and thrown into and out of operation at will.

With the above and other objects in view, the invention consists in the construction, combination and arrangement of parts hereinafter set forth in and falling within the scope of the claims.

In the accompanying drawings; Figure 1 is a view in side elevation of a digging machine constructed in accordance with the present invention, the same being shown as mounted upon a pontoon for dredging purposes. Fig. 2 is a similar view taken at right angles to Fig. 1 showing the digger in lowered position. Fig. 3 is a vertical central sectional view through the machine. Fig. 4 is a horizontal sectional view therethrough, parts being shown in top plan. Fig. 5 is a similar view taken on a plane below the platform and showing the truck in top plan. Fig. 6 is a bottom plan view of the truck showing the driving mechanism therefor. Fig. 7 is a fragmentary rear elevation of the machine showing the side of the machine opposite from that illustrated in Fig. 2. Fig. 8 is an enlarged fragmentary vertical sectional view through the machine. Fig. 9 is a similar view on the line 9—9 of Fig. 7, illustrating the mechanism controlling the vertical adjustment of the digger. Fig. 10 is a fragmentary cross sectional view through the machine showing the controlling mechanism for the driving means of the truck. Fig. 11 is a fragmentary longitudinal sectional view through the machine showing the mechanism in Fig. 10 in end elevation. Fig. 12 is a fragmentary side elevation of the machine showing the tightening mechanism for the drive belt of the digger and conveyer. Figs. 13, 14, 15, 16 and 17 are detail views of various parts of the machine.

Referring now to the drawings in detail, 1 designates a wheeled supporting truck comprising a base 2, axles 3, 3 journaled in suitable alining bearings depending from the base and disposed adjacent to the forward and rear ends of the latter, and flanged track wheels 4 fast upon the outer extremities of the axles. Depending from the under surface of the base 2 between the axles 3, 3 are transversely alining bearings 5, 5 in which is journaled a drive shaft 6 and keyed upon the drive shaft 6 and suitably spaced apart thereon are sprocket wheels 7, while keyed upon one of the axles 3 are sprocket wheels 8 and over the sprocket wheels 7 and 8 are trained endless chains 9 whereby in the rotation of the drive shaft 6 motion is imparted to the particular axle of the truck to propel the latter along the rails of the trackway. Extending upwardly from the base of the truck approximately centrally thereof is a hollow king post 10.

11 designates a substantially rectangular platform equipped centrally with a bearing 12 opening receiving the upper end of the king post 10 so that the platform may be revolved about the king post. Depending from the under surface of the platform and spaced apart equal distances concentrically of the king post are brackets 13 in the lower limbs of which are journaled supporting rollers 14 resting upon an annular track 15 secured to the upper surface of the base of the truck and adapted to coöperate with the rollers and brackets to prevent vibration of the platform and permit the latter to rotate about the king post.

In the present instance, the track 15 is shaped after the fashion of the bottom of a saucer, while the rollers 14 taper toward the axis of the platform and engage the track adjacent to the highest point thereof.

Rotatably mounted within the king post 10 is a vertical shaft 16 having the lower end thereof equipped with a bevel pinion 17 meshing with a similar pinion 18 fast upon the drive shaft 6 so that when the shaft 16 is revolved motion will be imparted to the drive shaft. Secured to the upper surface of the base of the truck concentrically of the saucer-like bearing is a toothed annulus 19 and meshing with the annulus 19 is a pinion 20 fast upon the lower end of a vertical shaft 21 passed through the platform adjacent to one side edge of the latter and mounted within a suitable bearing. By means of this construction, it will be seen that when motion is imparted to the shaft 21 the pinion meshing with the annulus on the base of the platform will revolve about such annulus planet fashion with the effect to revolve the platform.

Journaled in horizontally alining bearings arranged transversely of the platform is a main drive shaft 22 disposed above the upper end of the shaft 21. This main drive shaft is connected up with an appropriate form of driving motor 23 and keyed thereon is a bevel pinion 24 adapted to mesh with a similar pinion 25 splined upon the upper end of the shaft 21 for sliding movement. Formed on the lower face of the bevel pinion 25 and depending therefrom is a ring 26 formed with a peripheral groove and disposed within the groove in the ring 26 is an annulus 27 equipped at diametrically opposite points with outwardly projecting arms 28 extending beyond the marginal edge of the pinion 25 and connected with the lower extremities of vertical rods 29 depending from a cross bar 30 fastened to the lower end of a cord or cable 31, the other extremity of the cord or cable being connected to and trained about a drum 32 rotatably mounted upon a shaft 33 supported in suitable standards 34 spaced apart. Connected with one side wall of the drum 32 and extending radially therefrom is a hand lever 35 by means of which the drum may be rotated about the shaft 33. The rods 29 are slidably mounted within suitable guides 36 secured to the platform, while connected with the arms 28 and depending therefrom are coiled contractile springs 37 having the lower ends thereof secured to a suitable support, such springs acting to slide the bevel pinion 25 normally downwardly along the shaft 21 out of engagement with the pinion 24.

Extending upwardly from the platform and disposed to one side of the path of movement of the hand lever 35 is a segment 38 having the teeth 39 thereof adapted to be engaged by the hand lever to maintain the latter in the desired position. When it is desired to elevate the pinion 25 so as to engage the latter with the pinion 24, in order that the shaft 21 will be rotated to revolve the platform about the king post, the hand lever 35 is swung downwardly thereby rotating the drum 32 and exerting a pull upon the cord 31 whereby the cross bar 30, and rods 29, annulus 27 and bevel pinion 25 are elevated and the teeth of the latter meshed with the teeth of the pinion 24. When the pinions are brought into engagement, the hand lever 35 is engaged with the adjacent tooth 39 on the segment 38 thereby maintaining the pinion 25 elevated against the action of the springs 37. On the other hand, when the hand lever is disengaged from the adjacent tooth of the segment and released, the springs react and so lower the pinion 25 thereby disengaging the latter from the pinion on the main drive shaft.

Secured to the upper surface of the platform at opposite sides of the upper extremity of the shaft 16 within the king post are forked brackets 40, 41 alining transversely and pivoted within the bracket 40 and movable about a horizontal axis is a bearing 42, while slidably mounted within the bracket 41 is a bearing 43 and journaled in these alining bearings is a shaft 44 disposed above the upper extremity of the shaft 16 and keyed upon the shaft 44 is a bevel pinion 45 adapted to mesh with a similar pinion 46 fast to the upper extremity of the shaft 16. In the present instance, an inverted U-shaped yoke 47 projects upwardly from the bracket 41 and secured to the interconnecting member of such yoke and depending therefrom is a coiled contractile spring 48 having the lower extremity thereof secured to the bearing 43. This spring acts to slide the bearing 43 upwardly within the bracket 41 whereby the shaft 44 will swing, incident to the pivotal mounting of the bearing 42 within the bracket 40, thereby disengaging the bevel pinion 45 from the pinion 46. To swing the shaft downwardly against the action of the spring 48 different means may be employed. In this case, a drum 49 is journaled upon a stub shaft projecting outwardly from the bracket 41 below the bearing 43 and fastened to the periphery of such drum is one end of a cord 50 having the opposite end thereof secured to the bearing 43. Connected to the drum 49 and projecting upwardly therefrom is a hand lever 51 whereby the drum may be rotated to exert a pull upon the cord 50 and so lower the bearing 43 against the action of the spring 18. To hold the lever in the desired position, a toothed segment or rack 52 is disposed adjacent to the path of movement of the lever and adapted to be engaged thereby so that when the lever is swung to lower the shaft and so cause the bevel pinions 45 and 46 to engage, such lever may engage the adjacent tooth of the rack or segment to hold the bearing against upward sliding movement under the action of the spring. Fast upon the shaft 44 is a belt pulley 53, while fast upon the main drive shaft is a belt pulley 54 and trained over these pulleys is an endless drive belt 55 whereby motion is transmitted to the shaft 44 in the rotation of the main drive shaft. Thus, it will be seen that when the lever 51 is swung to slide the bearing 43 downwardly within the bracket 41 and engage the bevel pinion 45 with the pinion 46, motion will be transmitted from the main drive shaft through the pulleys 53 and 54 and the belt 55 to the shaft 44 and from the latter through the medium of the bevel pinions 45 and 46 to the shaft 16, the latter, in turn, operating the drive shaft of the truck to propel the machine along the trackway.

One end edge of the platform is cut out centrally as at 56 and secured to such edge of the platform immediately adjacent to the opposite sides of the cut out portion are pivot knuckles 57. 58 designates standards spaced apart in parallelism and having the lower extremities thereof formed with laterally projecting pivot knuckles 59 connected to the knuckles 57 whereby a pivotal connection between the standards 58 and the platform is formed. Brace rods 60, 60 are secured to the standards adjacent to the upper and lower ends respectively of the latter so as to maintain the standards against relative swinging movement. Formed in the standards 58 are longitudinal bores 61 opening onto the lower ends thereof, while formed in the confronting faces of the standards are guide grooves or ways 62 and slidably mounted within the bores 61 are rack bars 63 capable of vertical sliding movement. Journaled in the standards adjacent to the lower extremities thereof is a horizontal shaft 64 equipped with pinions 65, 65 working in the bores in the standards and meshing with the teeth of the rack bars in such bores so that as the shaft is rotated in one direction the rack bars will be moved upwardly within the standards, while when the direction of rotation of the shaft is reversed the rack bars will descend. Rods 66, 66 lie parallel with the rack bars between the latter and are spaced apart and the lower ends of such rods are suitably connected as at 67 with the rack bars adjacent to the lower extremities of the latter, while the upper portions of the rods lie between the standards and secured to the upper extremities of such rods are horizontally alining bearings 68 in which is journaled a shaft 69 having the opposite extremities thereof disposed within the ways 62 and adapted for sliding movement therein. Journaled in suitable transversely alining bearings carried by the lower ends of the rack bars 63 is a shaft 70 and fast upon the shafts 69 and 70 are rollers 71, 71 each having longitudinal ribs 72, 72 formed thereon at diametrically opposite points, while loose upon each shaft at the opposite ends of the roller thereon are relatively short rollers 73, 73. Trained over the relatively short rollers on the shafts 69 and 70 are endless chains 74, 74 spaced apart in parallelism. Suitably fastened to the chains 74 and extending outwardly therefrom are buckets 75 adapted to travel with the chains and spaced apart distances equal to the distance between the ribs on the rollers 71, 71 so that in the rotation of the latter under the action of the shaft each rib will move behind the adjacent bucket and engage the rear edge of the latter with the effect to impart movement to the buckets and chains. The buckets and chains constitute, in effect, a chain conveyer, and this conveyer together with the rods 66 supporting the upper shaft of the conveyer, and the rack bars supporting the lower shaft of the conveyer coöperate to form what may be termed a digging mechanism. The outer edges of the buckets 75 are preferably toothed as at 76 to facilitate the digging.

Extending laterally from one of the standards 58 and disposed adjacent to the upper and lower extremities of such standard are alining bearings 77, in which is journaled a hollow shaft section 78 having the bore thereof non-circular in cross section and slidably mounted within the non-circular bore of the hollow shaft section is a solid shaft section 79 of a cross sectional contour conforming to that of the bore of the hollow shaft section. The lower end of the solid shaft section 79 terminates adjacent to the lower extremity of the proximate rack bar and fast upon such extremity of the solid shaft section is a bevel pinion 80 meshing with a similar pinion 81 fast upon the adjacent end of the shaft 70.

82 designates a brace bar connecting the lower extremity of the solid shaft section 79 to the end of the adjacent rack bar, as shown in Fig. 13.

Journaled in horizontally alining bearings carried by the upper extremities of the standards 58 is a drive shaft 83 and keyed upon one end of the drive shaft 83 is a bevel pinion 84 meshing with a similar pinion 85 fast upon the upper end of the telescopic shaft composed of the sections 78 and 79. Keyed upon the opposite end of the drive shaft 83 is a belt pulley 86. Extending upwardly from the platform below the belt pulley 86 are segment shaped standards 87, 87 each formed of a stationary bar 88 and a movable bar 89 parallel with the stationary bar and spaced apart therefrom and having the lower extremity thereof pivotally connected with the platform. Mounted between the bars of the segment shaped standards 87, 87 are bearing blocks 90 capable of sliding movement within the standards and journaled in the bearing blocks 90 is a horizontal shaft 91 upon which is keyed a belt pulley 92 and over the belt pulleys 86 and 92 is trained an endless driving belt 93. Also keyed upon the shaft 91 is a sprocket wheel 94, while loosely mounted upon the adjacent end of the main drive shaft 22 is a sprocket wheel 95 and over the sprocket wheels 94 and 95 is trained a chain 96. One end edge of the hub of the sprocket wheel 95 is formed with teeth 97, while splined upon the shaft 22 for sliding movement thereon adjacent to the teeth 97 on the sprocket wheel 95 is a clutch collar 98 having one end thereof formed with teeth 99 adapted to interlock with the teeth 97 on the sprocket wheel 95, this structure being clearly illustrated in Fig. 4.

In practice, when the clutch collar 98 is shifted along the shaft so that the teeth 99 interlock with the teeth 97 on the sprocket wheel 95, motion is imparted to the latter to drive the sprocket wheel 94 through the medium of the chain 96. In the rotation of the sprocket wheel 94 the shaft 91 and belt pulley 92 revolve thereby actuating the driving belt 93, belt pulley 86 and drive shaft 83 and in the rotation of the shaft 83 motion is transmitted to the telescopic shaft composed of the hollow shaft section 78 and the solid shaft section 79 with the effect to revolve the stub shaft 70 carried by the lower ends of the adjustable rack bars 63, thereby rotating the endless conveyer composed of the rollers 71, 71, chains 74, 74 and buckets 75 so that the material with which the buckets at the lower end of the conveyer engage will be carried upwardly thereby.

The upper extremities of the bars 88 and 89 constituting the standards 87, 87 are formed with alining openings through which are passed clamping bolts 100 whereby the movable bar of each standard may be moved toward the stationary bar to clamp the bearing block sliding therein and hold the latter against movement as shown in Fig. 12. Connected with each bearing block is one extremity of a cord or cable 101 and these cords or cables are trained around sheaves 102 carried in blocks secured to the platform below the shafts 91 and having the outer ends thereof fastened to a windlass 103 mounted upon the platform and operable from a hand wheel 104. By means of this construction, it will be seen that when the clamping bolts 100 are actuated to release the movable bars of the standards, the bearing blocks within such standards will be free to move therein so that the windlass may be operated to draw the blocks downwardly within the standards to tighten the driving belt 93, the clamping bolts being subsequently actuated to move the movable bars of the standards toward the stationary bars to grip the bearing blocks. Thus, the driving belt of the digging mechanism may be at all times held taut to facilitate the operation of such mechanism.

In the present instance, the shifting mechanism for the clutch collar 98, shown in Fig. 4, comprises a lever 105 fulcrumed at one end as at 106 and connected, centrally, with a ring 107 lying within a groove in the periphery of the clutch collar 98. The outer end of the lever 105 extends through and works within a horizontal slot 108 formed in an upright 109 adjacent to the upper end thereof. Below the slot 108 at the opposite ends thereof the outer face of the upright 109 is equipped with vertically alining guides 110 and within the guides 110 are slidably disposed, parallel guide bars 111 carrying, at their upper ends, a horizontal rack 112, while connected with the opposite extremities of the rack bar are coiled contractile springs 113 having the upper ends thereof secured to the upper edge of the upright. Depending from the rack bar 112 is a link 114 and the lower end of the link is pivotally connected to a treadle 115 fulcrumed at one end as at 116 to the upright adjacent to the lower extremity of the latter. A coiled expansion spring 117 surrounds the main drive shaft 22 between the confronting faces of the clutch collar 98 and sprocket wheel 94 and acts to hold the teeth on the clutch collar normally out of engagement with the teeth on the sprocket wheel. When it is desired to shift the clutch collar so that the teeth thereof will engage with the teeth on the sprocket wheel, the treadle 115 is depressed thereby drawing the rack bar 112 downwardly against the action of the springs 113 so as to release the lever 105. The lever is now swung about its fulcrum 106 and the ring connected therewith and disposed within the groove in the clutch collar 98 actuates the latter against the action of the spring 117 so that the teeth on the confronting faces of the clutch collar and sprocket wheel 95 interlock thereby forming a connection between the sprocket wheel and the main drive shaft whereby the digging mechanism is actuated as previously described. Succeeding the clutching of the sprocket wheel to the shaft, the treadle 115 is released and the springs 113 react and draw the rack bar 112 upwardly so that the teeth thereon engage the lever 105 and hold the latter against return to normal position under the action of the spring 117. To disengage the sprocket wheel from the shaft, the treadle 115 is depressed and the spring controlling the clutch reacts and so disengages the teeth 99 from the teeth 97.

Projecting rearwardly from the standards 58 adjacent to the upper ends thereof are supporting arms 118 and journaled in these arms is a horizontal shaft 119, while projecting rearwardly from the standards adjacent to the lower extremities thereof are arms 120 having the outer ends thereof equipped with horizontally alining bearings in which is journaled a shaft 121. Fast upon the shafts 119 and 121 are four pointed star shaped rollers 122 and over these rollers is trained an endless belt 123 constructed of any suitable material. Fastened to the outer surfaces of the rungs of the belt 123 are buckets 124 spaced apart distances equal to the distances between the points of the star shaped rollers so that the latter will act upon the buckets after the fashion of a sprocket wheel and chain thereby rotating the belt and buckets thereon in the movement of the rollers. In this embodiment of my invention, the opposite extremities of the shaft 119 is provided with belt pulleys 125, while the adjacent portions of the drive shaft 83 are equipped with belt pulleys 126 and over the belt pulleys 125 and 126 are trained endless crossed belts 127 whereby in the movement of the drive shaft 83 on the digging mechanism motion is imparted to the shaft 119 to revolve the belt 123 whereby the buckets thereon are carried around in the same direction as the buckets of the conveyer of the digging mechanism. The star shaped wheels or rollers 122, the belt 123 trained about such rollers and the buckets 124 carried by the belt 123 constitute a conveyer and this conveyer traverses a path parallel to the path of the conveyer of the digging mechanism so that the material carried up by the buckets and the digging mechanism will be dumped or thrown into the buckets 124 of the last mentioned conveyer as the buckets of the digging mechanism conveyer turn about the upper roller 71 to travel downwardly. Secured to the standards 58 adjacent to the upper ends thereof and extending rearwardly therefrom and inclosing the upper portion of the second conveyer is a trough 128 into which the second conveyer discharges and depending from the trough is a spout 129 with which suitable conveying pipes may be connected. Thus, the material thrown onto the second conveyer from the conveyer of the digging mechanism will be discharged into the trough 128 and subsequently carried away by way of the spout 129 and conduits or pipes connected thereto, such conduits leading to the desired point of waste.

In order to rotate the shaft 64 so that the rack bars of the digging mechanism may be actuated to elevate or lower such mechanism, according to the movement of the shaft, a hand wheel 130 is fast upon one end of the shaft 64 and when rotated by the operator or engineer imparts movement to the shaft 64 to slide the rack bar in one direction or the other, according to the direction of rotation of the shaft. Fast upon the shaft 64 between the hand wheel 130 and the adjacent standard is a winding drum 131 to which is connected one end of a cable or rope 132. As shown in Fig. 2, the opposite end of the cable or rope is trained over a sheave 133 mounted upon the upper end of the adjacent standard 58 and a sheave 134 carried by an arm 135 extending outwardly from the other standard and holding the sheave 134 at a point approximately centrally of the standard, and connected with a cross bar 136 having the opposite extremities thereof disposed within the guideways or grooves 62 and connected with the adjacent extremities of the rods 66, 66. Thus, when the hand wheel 130 is rotated to actuate the shaft 64 to elevate the digging mechanism the cable or rope 132 is wrapped about the drum 131 and so exerts a pull on the upper end of the conveyer of the digging mechanism thereby assisting in the elevating thereof, while when the shaft 64 is reversed to lower the digging mechanism the drum unwinds and so slackens the rope or cable 132 as the conveyer of the digging mechanism descends. Fast to one side of the drum 131 is a ratchet wheel 137 with which engages a dog 138 pivoted upon the adjacent standard and coacting with the ratchet wheel to prevent retrograde movement of the winding drum succeeding the hoisting of the digging mechanism.

In some instances, particularly where the machine is used for dredging purposes, the load on the conveyer of the digging mechanism will be of such weight as to prohibit the elevating of the digging mechanism by means of the hand wheel on the shaft and when such contingency arrives, the shaft 64 is driven from the main drive shaft of the machine and the connection between the main drive shaft and the shaft 64 is manually controlled so that the latter may be driven from the main shaft at any time. In the embodiment of my invention selected for illustrative purposes, this manually controlled driving mechanism, shown in Fig. 4, comprises a countershaft 139 journaled in horizontally alining bearings carried by the platform and arranged in parallelism with the main drive shaft 22. Fast upon the countershaft 139 is a sprocket wheel 140, while connected with the shaft 64 is a sprocket wheel 141. Over the sprocket wheels 140 and 141 is trained an endless chain 142. Fast upon the countershaft adjacent to one end thereof is a gear wheel 143 meshing with a similar wheel 143 meshing with a similar wheel 144 loose upon the main drive shaft, while fixed to the countershaft adjacent to the opposite end thereof is a sprocket wheel 145 and loosely surrounding the main drive shaft adjacent to the sprocket wheel 145 is a second sprocket wheel 146. An endless chain 147 is trained over the sprocket wheels 145 and 146. Splined upon the main drive shaft between the gear wheel 144 and the sprocket wheel 146 is a clutch collar 148 capable of sliding movement along the shaft and provided, at diametrically opposite points, with arms 149 disposed in a vertical plane and formed with apertures 150 through which are passed guide rods 151 disposed above and below the main drive shaft parallel therewith and fastened to the standards supporting the bearings of the said shaft in proximity to the gear wheel 144 and sprocket wheel 146. The opposite edges of the collar 148 are formed with teeth 152, while the confronting faces of the gear wheel 144 and sprocket wheel 146 are formed with teeth 153. Springs 154 have certain ends fastened to the arms 149 respectively and the opposite extremities secured to the standard supporting the bearing of the main drive shaft adjacent to the sprocket wheel 146 thereon as clearly illustrated in Fig. 7. Connected with the opposite sides of the arms 149, that is, to say, the sides of the arms opposite from the springs 154, are the branches of a cable or cord 155, such branches being trained through appropriate eyes to facilitate the movement of the cable when it is desired to shift the clutch collar against the action of the springs 154. The opposite end of the cable or cord 155 is connected to the periphery of a drum 156 journaled upon an axle 157 carried by vertically disposed disks 158 spaced apart in parallelism and mounted upon a pedestal 159. Connected to the periphery of the drum 156 and projecting radially therefrom is a hand lever 160 by means of which the drum may be rotated in one direction or the other to pull or release the cable. This hand lever is equipped with a latching dog 161 adapted to engage teeth 162 formed upon the upper portion of the periphery of one of the disks 158. When the lever is in the center of the row of teeth 162 the clutch collar is held spaced apart from between the toothed faces of the gear wheel 144 and sprocket wheel 146 so that in the operation of the main drive shaft the countershaft 139 remains idle, while when the lever is swung to one end of the row of teeth the cable is released and the springs 154 react and slide the clutch collar along the shaft so that the particular set of teeth thereon interlock with the adjacent set of teeth 153 on the sprocket wheel 146. On the other hand, when the lever is at the opposite end of the row of teeth 162, the teeth on the opposite side of the clutch collar will interlock with the teeth of the gear wheel 144 whereby the latter is connected with the main drive shaft and the countershaft rotated in a direction reverse to the rotation thereof under the action of the sprocket wheels 145 and 146 and the chain 147 as is readily apparent.

In operation, when it is desired to lower the digging mechanism from the main power shaft, the lever 160 is swung so as to exert a pull upon the cable or cord 155 and slide the clutch collar 148 so that the teeth thereon will interlock with the teeth on the gear wheel 144 thereby connecting the countershaft with the main shaft so that the chain 142 will be operated to revolve the shaft 64 and lower the rack bars and mechanism carried thereby. On the contrary, when it is desired to elevate the digging mechanism the latching dog on the hand lever 160 is disengaged from the adjacent teeth and the hand lever swung to the opposite end of the row of teeth thereby permitting the springs 154 to react and slide the clutch collar 148 so that the teeth thereon will interlock with the teeth of the sprocket wheel 146 thereby connecting the countershaft with the main shaft through the medium of the sprocket wheels 145 and 146 and the chain 147 whereby the countershaft will be rotated in a direction reverse to the movement thereof under the action of the gear wheels 143 and 144. Thus, the shaft 64 will be revolved to elevate the digging mechanism.

In order to swing the standards 58 about their pivotal connections with the platform so that the digging mechanism and the conveyer receiving the material from the digging mechanism may be swung or tilted to any desired angle relatively to the vertical and held in adjusted position any suitable mechanism may be employed. In the present embodiment of my invention this mechanism, illustrated in Figs. 1, 13 and 16, comprises bearings 163 secured to the rear edges of the standards 58 adjacent to the upper extremities thereof and journaled in the bearings and extending outwardly from the outer sides of the standards are trunnions 164. To the outer extremities of the trunnions 164 are secured blocks 165 and disposed within the blocks 165 are nuts 166 through which are threaded rods 167 as shown in Fig. 16. The lower ends of the rods 167 are rotatably mounted within bearing blocks 168 formed at their lower extremities with laterally projecting trunnions 169 journaled in horizontally alining bearings 170 secured to the upper surface of the platform adjacent to the rear edge thereof. Fast upon the rods 167 are oppositely disposed bevel gears 171 arranged in parallel planes and meshing with the gears 171 are similar gears 172 keyed upon a shaft 173 arranged transversely of the rods 167 and journaled in spring held bearings 174 carried by the rods and each acting upon the shaft to hold the adjacent bevel gear thereon in mesh with the bevel gear on the rod. A hand wheel 175 is keyed upon one end of the shaft 173 and when rotated in one direction revolves the last named shaft and the latter rotates the rods 167 in like directions, incident to the arrangement of the bevel gears upon the rods, thereby swinging the standards 58 to dispose the digging mechanism in a substantially vertical plane or incline such mechanism relatively to the vertical according to the direction of rotation of the shaft 173.

By means of the belt tightener formed by the segment shaped standards 87, 87 the bearing blocks 90 within such standards, the cords 101 and the windlass 103, the driving shaft 93 may be at all times tightened so as to take up any slack incident to the movement of the drive shaft 32 and standards 58.

A chain tightener 176 is employed to take up the slack in the chain 142 incident to the movement of the shaft 64 swinging with the standards 58. In the present instance, this chain tightener, shown in detail in Fig. 15, comprises standards 177, 177 uprising from the platform and disposed at opposite sides of the chain 142 approximately centrally thereof. These standards have the confronting faces thereof formed with ways 178 and within the ways are mounted blocks 179 capable of vertical sliding movement and carrying rollers 180 disposed below the runs of the chain 142. Connecting the upper extremities of the blocks 179 is a cross piece 181 to which is secured an upstanding threaded stem 182 projecting through a bearing 183 carried by a cross bar 184 fastened to the upper extremities of the standards 177 and spanning the latter. Threaded onto the upper end of the stem 182 is a nut 185 equipped with outwardly extending handles 186 whereby the nut may be rotated. When the nut is rotated in one direction the stem is elevated thereby drawing the blocks 179 and rollers 180 upwardly with the effect to tighten the chain, while when the direction of rotation of the nut is reversed the stem, blocks and rollers descend whereby the chain is lengthened.

A cover 187 closes the upper end of the trough 128 and is suitably fastened to the upper ends of the standards 58, while secured to the forward edges of the standards 58 is a cover 188 having the upper edge thereof connected with the adjacent end of the cover 187 and coöperating therewith to inclose the adjacent mechanism, the lower end of the cover 188 terminating adjacent to the lower extremities of the standards. In this instance, the rear end of the cover 187 is hinged as at 189, as shown in Figs. 1 and 3, so that access may be had to the interior of the trough when desired.

From the foregoing description taken in connection with the accompanying drawings, the construction, mode of operation and manner of employing my improved digging machine will be readily apparent.

It will be seen that I have provided a digging machine which may be put to a variety of uses, such as dredging channels, excavating and conveying coal, grain and the like from one ship to another and for many other purposes.

In employing the machine as a dredge, as shown in Figs. 1, 2, 3 and 13, the truck 1 is run out on the rails 190 of a pontoon 191 and the digging mechanism projected into the water between arms 192 extending outwardly from one edge of the pontoon and spaced apart a distance to accommodate the digging mechanism, the space between the arms 192 and the cut out portion 56 in the platform 11 permitting the free movement of the buckets of the conveyer of the digging mechanism.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention. For instance, other mechanism may be employed for driving and controlling the drive shaft of the conveyers, while the mechanism for elevating and lowering the digging apparatus may be changed.

I claim:

1. In a machine of the class described, a platform, standards pivoted at their lower ends to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed in said grooves, a shaft journaled in the lower ends of said bars, rollers keyed upon said shafts, an endless conveyer belt trained about said rollers, means for rotating said first shaft to raise and lower said bars, rods and conveyer belt, and means for swinging said standards to move the conveyer to any desired angle.

2. In a machine of the class described, a platform, standards pivoted at their lower ends to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed in said grooves, a shaft journaled in the lower ends of said bars, rollers keyed upon said shafts, an endless conveyer belt trained about said rollers, means for rotating said first shaft to raise and lower said bars, rods and conveyer belt, and manually operable means for swinging said standards to move the conveyer to any desired angle.

3. In a machine of the class described, a platform, standards pivoted at their lower ends to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed in said grooves, a shaft journaled in the lower ends of said bars, rollers keyed upon said shafts, an endless conveyer belt trained about said rollers, means for rotating said first shaft to raise and lower said bars, rods and conveyer belt, bearings carried by the rear edges of said standards, trunnions journaled in said bearings and projecting laterally therefrom, blocks fastened to said trunnions, nuts within said blocks, rods threaded through said nuts, means supporting the lower ends of said rods, and means for rotating said rods to swing said standards.

4. In a machine of the class described, a platform, standards pivoted at their lower ends to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed in said grooves, a shaft journaled in the lower ends of said bars, rollers keyed upon said shafts, an endless conveyer belt trained about said rollers, means for rotating said first shaft to raise and lower said bars, rods and conveyer belt, bearings carried by the rear edges of said standards, trunnions journaled in said bearings and projecting laterally therefrom, blocks fastened to said trunnions, nuts within said blocks, rods threaded through said nuts, means supporting the lower ends of said rods, a hand operated shaft, gear connections between said last shaft and rods whereby the rods will be rotated in like directions in the rotation of the shaft, and means for rotating said shaft.

5. In a machine of the class described, a platform, standards having their lower ends secured to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed within said grooves, a shaft journaled in the lower ends of said bars, rollers keyed upon said shafts, an endless conveyer belt trained about said rollers, a second conveyer disposed in a plane parallel with said conveyer belt and adapted to receive the material therefrom, and means for rotating said first shaft to raise and lower said bars, rods and conveyer belt.

6. In a machine of the class described, a platform, standards having their lower ends secured to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed within said grooves, a shaft journaled in the lower ends of said bars, rollers keyed upon said shafts, an endless conveyer belt trained about said rollers, a second conveyer disposed in a plane parallel with said conveyer belt and adapted to receive the material therefrom, and manually operable means for rotating said first shaft to raise and lower said bars, rods and conveyer belt.

7. In a machine of the class described, a platform, standards having their lower ends secured to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed within said grooves, a shaft journaled in the lower ends of said bars, rollers keyed upon said shafts, an endless conveyer belt trained about said rollers, a second conveyer disposed in a plane parallel with said conveyer belt and adapted to receive the material therefrom, manually operable means for rotating said first shaft to raise and lower said bars, rods and conveyer belt, and power operated means for driving said first shaft to raise and lower said bars, rods and conveyer belt.

8. In a machine of the class described, a platform, standards having their lower ends secured to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed within said grooves, a shaft journaled in the lower ends of said bars, rollers keyed upon said shafts, an endless conveyer belt trained about said rollers, a second conveyer disposed in a plane parallel with said conveyer belt and adapted to receive the material therefrom, manually operable means for rotating said first shaft to raise and lower said bars, rods and conveyer belt, and means common to said conveyer belt and conveyer for driving the same.

9. In a machine of the class described, a platform, standards pivoted at their lower ends to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed in said grooves, a shaft journaled in the lower ends of said bars, rollers keyed upon said shafts, an endless conveyer belt trained about said rollers, means for rotating said first shaft to raise and lower said bars, rods and conveyer belt, means for swinging said standards to move the conveyer to any desired angle, a truck supporting said platform, and means for driving said truck.

10. In a machine of the class described, a platform, standards pivoted at their lower ends to said platform at one edge of the latter and formed with longitudinal bores, and grooves in the confronting faces thereof, rack bars slidably mounted in said bores, a shaft journaled in said standards, pinions on said shaft meshing with said rack bars, vertical rods parallel with said bars and spaced apart, a connection between the lower end of each rod and the adjacent rack bar, a shaft journaled in the upper ends of said rods and having the opposite extremities thereof disposed in said grooves, a shaft journaled in the lower ends of said bars, rollers keyed upon said shafts, an endless conveyer belt trained about said rollers, means for rotating said first shaft to raise and lower said bars, rods and conveyer belt, means for swinging said standards to move the conveyer to any desired angle, a truck supporting said platform, means for driving said truck, and means whereby said platform may be rotated upon said truck.

11. In a machine of the class described, a platform, standards pivoted at their lower ends to said platform at one edge of the latter and formed with longitudinal bores, and grooves in the confronting faces thereof, rack bars slidably mounted in said bores, a shaft journaled in said standards, fingers on said shaft meshing with said rack bars, vertical rods parallel with said bars and spaced apart, a connection between the lower end of each rod and the adjacent rack bar, a shaft journaled in the upper ends of said rods and having the opposite extremities thereof disposed in said grooves, a shaft journaled in the lower ends of said bars, rollers keyed upon said shafts, and endless conveyer belt trained about said rollers, means for rotating said first shaft to raise and lower said bars, rods and conveyer belt, means for swinging said standards to move the conveyer to any desired angle, a truck supporting said platform, means for driving said truck, and power driven manually controlled means for rotating said platform upon said truck.

In testimony whereof I affix my signature in presence of two witnesses.

DANIEL A. PENEDO.

Witnesses:
DANIEL ARMESTO,
BENITO QUINTOS.